US008374316B2

(12) United States Patent
Burckart et al.

(10) Patent No.: US 8,374,316 B2
(45) Date of Patent: Feb. 12, 2013

(54) SYSTEM FOR RECORDING SPOKEN PHONE NUMBERS DURING A VOICE CALL

(75) Inventors: Erik J. Burckart, Raleigh, NC (US);
Travis M. Grigsby, Austin, TX (US);
Andrew Ivory, Wake Forest, NC (US);
Aaron K. Shook, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1566 days.

(21) Appl. No.: 11/846,223

(22) Filed: Aug. 28, 2007

(65) Prior Publication Data

US 2009/0060156 A1 Mar. 5, 2009

(51) Int. Cl.
*H04M 1/64* (2006.01)
*H04M 11/00* (2006.01)

(52) U.S. Cl. .................. 379/88.01; 379/88.14
(58) Field of Classification Search ..... 379/88.01–88.28
See application file for complete search history.

(56) References Cited

U.S. PATENT DOCUMENTS

| 6,330,308 | B1 * | 12/2001 | Cheston et al. | 379/88.04 |
|---|---|---|---|---|
| 6,574,599 | B1 * | 6/2003 | Lim et al. | 704/270 |
| 7,174,191 | B2 * | 2/2007 | Doble | 455/563 |
| 7,251,313 | B1 * | 7/2007 | Miller et al. | 379/88.01 |
| 7,260,534 | B2 * | 8/2007 | Gandhi et al. | 704/270 |
| 7,401,023 | B1 * | 7/2008 | Schwartz et al. | 704/275 |
| 7,447,636 | B1 * | 11/2008 | Schwartz et al. | 704/275 |
| 7,844,460 | B2 * | 11/2010 | Charlier et al. | 704/257 |
| 7,970,108 | B2 * | 6/2011 | Pence et al. | 379/88.13 |
| 2002/0077833 | A1 * | 6/2002 | Arons et al. | 704/277 |
| 2008/0260114 | A1 * | 10/2008 | Siminoff | 379/88.14 |

* cited by examiner

*Primary Examiner* — Joseph T Phan
(74) *Attorney, Agent, or Firm* — Yudell Isidore Ng Russell PLLC

(57) ABSTRACT

A method, system and computer program product for employing speech recognition technology to recognize a number spoken during a telephone call and a voicemail message. A speech recognition and transcription (SRT) utility within a communication device (e.g., a telephone) detects spoken numbers (and spoken phrases which may be associated with telephone numbers), and transcribes the numbers into text. The SRT utility then determines whether a sequence of the transcribed spoken numbers is a telephone number. If the transcribed sequence of numbers is a telephone number, the SRT utility records the telephone number in a pre-specified "events" list (in the telephone) of the intended listener. Consequently, the recipient has the option of retrieving the recorded events (numbers) and communicating with other parties via the retrieved numbers. For example, these phone numbers may then be dialed, saved as contacts, and text messaged.

9 Claims, 4 Drawing Sheets

SYSTEM FOR RECORDING SPOKEN PHONE NUMBERS DURING A VOICE CALL

BACKGROUND

1. Technical Field

The present invention generally relates to communication devices and in particular to speech recognition technology embedded into communication devices.

2. Description of the Related Art

Conversing parties during a phone call often refer each other to phone numbers. A common example occurs during a voicemail call, in which the caller leaves his or her phone number in the recorded voicemail message. This number may or may not be the number that the caller actually called from. Conventional methods of retrieving a telephone number from the voicemail message involve listening to the message while manually/physically recording (or memorizing) the number. Similarly, numbers uttered during a conversation are obtained by physically recording the number or by memorizing the number. However, this manual system of retrieving telephone numbers usually proves to be inefficient. Human memory often fails to recall information with complete precision. Numbers that were jotted down often gets lost. A user then has to resort to listening to the message again or suffer the inconvenience of not being able to easily access the number since the conversation is long ended or the message (containing the correct number) has been deleted.

SUMMARY OF ILLUSTRATIVE EMBODIMENTS

Disclosed are a method, system and computer program product for employing speech recognition technology to recognize a number spoken during a telephone call and a voicemail message. A speech recognition and transcription (SRT) utility within a communication device (e.g., a telephone) detects spoken numbers (and spoken phrases which may be associated with telephone numbers), and transcribes the numbers into text. The SRT utility then determines whether a sequence of the transcribed spoken numbers is a telephone number. If the transcribed sequence of numbers is a telephone number, the SRT utility records the telephone number in a pre-specified "events" list (in the telephone) of the intended listener. Consequently, the recipient has the option of retrieving the recorded events (numbers) and communicating with other parties via the retrieved numbers. For example, these phone numbers may then be dialed, saved as contacts, and text messaged.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
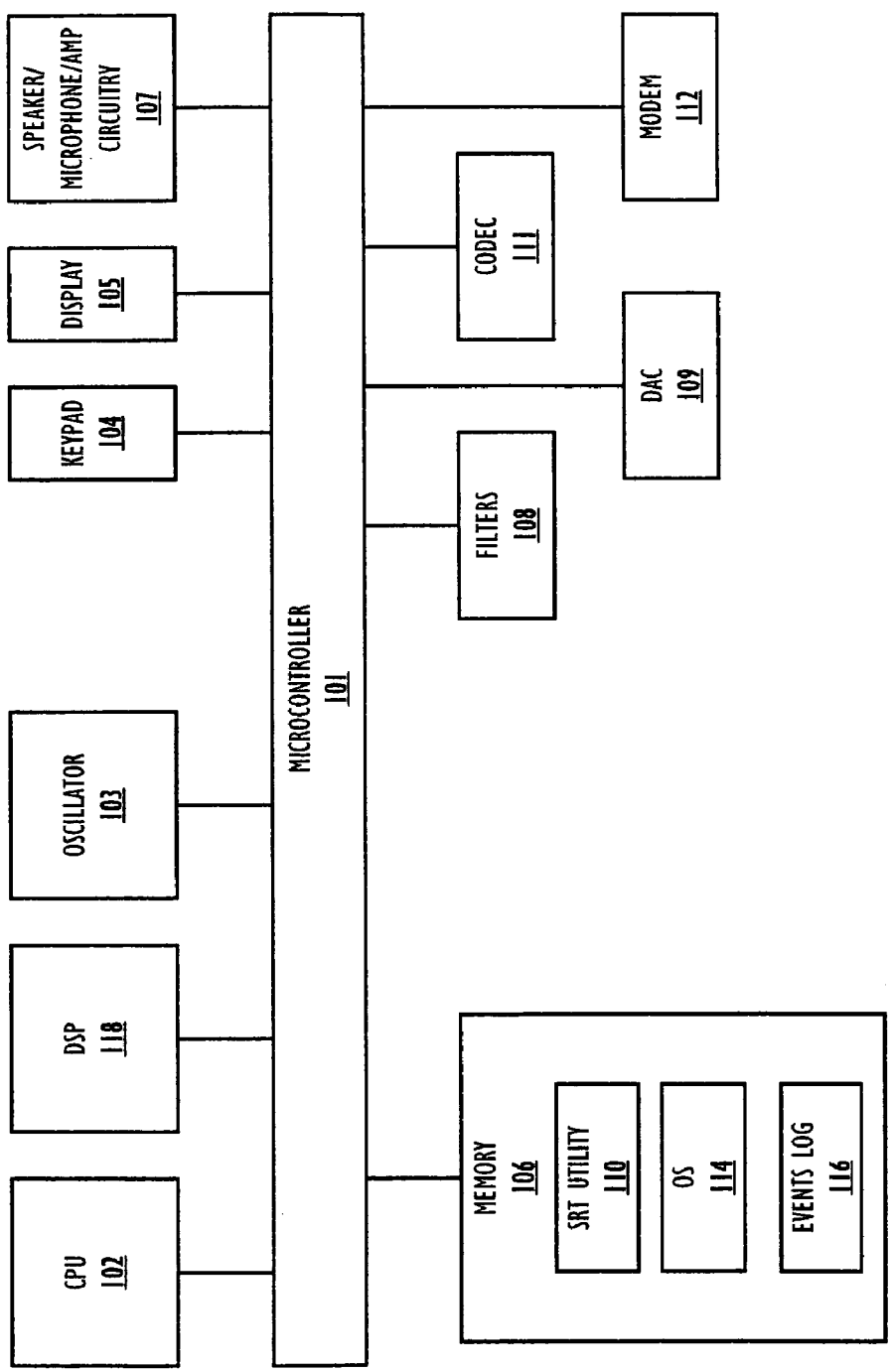
FIG. 1 is a block diagram representation of a telephone circuit according to one embodiment of the invention.

The illustrative embodiments provide a method, system and computer program product for employing speech recognition technology to recognize a number spoken during a telephone call and a voicemail message. A speech recognition and transcription (SRT) utility within a communication device (e.g., a telephone) detects spoken numbers (and spoken phrases which may be associated with telephone numbers), and transcribes the numbers into text. The SRT utility then determines whether a sequence of the transcribed spoken numbers is a telephone number. If the transcribed sequence of numbers is a telephone number, the SRT utility records the telephone number in a pre-specified "events" list (in the telephone) of the intended listener. Consequently, the recipient has the option of retrieving the recorded events (numbers) and communicating with other parties via the retrieved numbers. For example, these phone numbers may then be dialed, saved as contacts, and text messaged.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the terms "phone", "telephone", and "communication device" refer to any means by which voice (human utterance) or an audio signal may be communicated, i.e., transmitted and/or received over a communication channel.

With reference now to the figures, FIG. 1 depicts a block diagram representation of a telephone device. Device 100 comprises at least one processor or central processing unit (CPU) 102 connected to system memory 106 via Microcontroller 101. Microcontroller 101 provides connectivity and control for input devices, of which keypad 104 is illustrated, and output devices, of which display 105 is illustrated. Device 100 includes DSP 118 for executing all requisite signal processing functions. Device 100 also comprises speaker/microphone/amplifier circuitry 107.

As a telephone and voice communication device, device 100 is equipped with both the functionality of a transmitter and a receiver. With this dual functionality, device 100 may generally be referred to as having the features and functionality of a transceiver. Thus Device 100 is further equipped with oscillator 103, coupled to microcontroller 101. Device 100 also comprises transmit and receive filters, illustrated by filter 108. In addition, device 100 comprises coders/encoders, illustrated by codec 111, for the purposes of error detection and correction. Also included in device 100 is a digital-to-analog signal converter as well as an analog-to-digital converter, both illustrated by DAC 109. Device 100 is also illustrated with a modulator/demodulator (modem) 112.

Those of ordinary skill in the art will appreciate that the hardware depicted in FIG. 1 is a basic illustration of a telephone, and thus the hardware utilized in actual implementation may vary. Thus, the depicted example is not meant to imply architectural limitations with respect to the present invention.

Notably, in addition to the above described hardware components of Device 100, various features of the invention are completed via software (or firmware) code or logic stored within memory 106 and executed by CPU 102. Thus, illustrated within memory 106 are a number of software/firmware components, (optionally) including operating system (OS) 114, including events log 116, and speech recognition and transcription (SRT) utility 110. In actual implementation, the code of which SRT utility 110 is comprised is executed by CPU 102. For simplicity, SRT utility 110 is illustrated and described as a stand alone or separate software/firmware component, which provides specific functions, as described below.

CPU 102 executes SRT utility 110 as well as OS 114, which supports the user interface features of SRT utility 110. In the illustrative embodiment, SRT utility 110 generates/provides several graphical user interfaces (GUI) to enable user interaction with, or manipulation of, the functional features of the utility (110). Among the software code/instructions provided by SRT utility 110, and which are specific to the invention, are: (a) code for employing speech recognition technology to recognize a number spoken during a telephone call and a voicemail message; (b) code for transcribing the spoken number into text; (c) code for determining whether a sequence of the transcribed spoken numbers is a telephone number; and (d) code for recording the telephone number in a pre-specified events log 116 of the telephone of the listener (of the spoken number). For simplicity of the description, the collective body of code that enables these various features is referred to herein as SRT utility 110. According to the illustrative embodiment, when CPU 101 executes SRT utility 110, Device 100 initiates a series of functional processes that enable the above functional features as well as additional features/functionality, which are described below within the description of FIGS. 2-4.

In Device 100, electrical analog (speech) signals are produced by the microphone which detects speech, which is magnified by the amplifier. Microcontroller 101 receives instructions from keypad 104 and controls the operation of display 105. Whenever transcription of the speech signal occurs on the side of the person who is speaking, SRT utility 110 processes the speech signal prior to modulation by modem 112. However, when transcription of the speech signal occurs on the side of the person who is listening, SRT utility 110 processes the speech signal after demodulation by modem 112. Thus, SRT utility 110 operates on the baseband signal.

Figure 2:
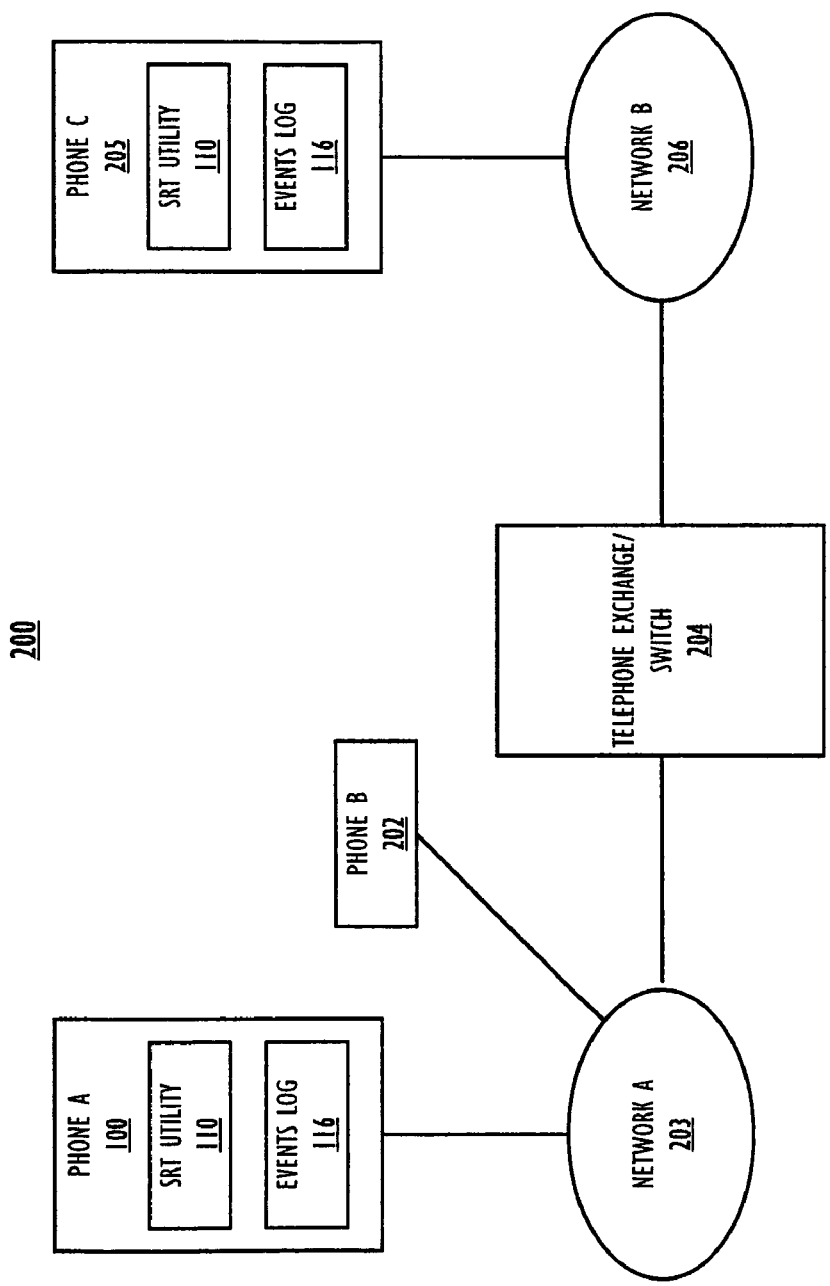
FIG. 2 illustrates an example telephone network, in accordance with one embodiment of the invention.

With reference now to FIG. 2, a telephone network is illustrated according to an illustrative embodiment of the present invention. Network 200 comprises phone A 100 and phone B 202 which both connect to exchange 204 via network A 203. Network 200 also comprise phone C 205, which connects to exchange 204 via network B 206. Phone A 100 and phone C 205 both include the features and functionality enabled by SRT utility 110. In addition, Phone A 100 and phone C 205 both include events log 116.

SRT utility 110 enables (at least) two parties having a telephone conversation in which the parties are respectively using phone A 100 and phone C 205, for example, to communicate with each other while taking advantage of the features and functionality enabled by SRT utility 110. SRT utility 110 provides both parties with an efficient and automatic method of recognizing, transcribing and recording telephone numbers spoken during the conversation.

Figure 3:
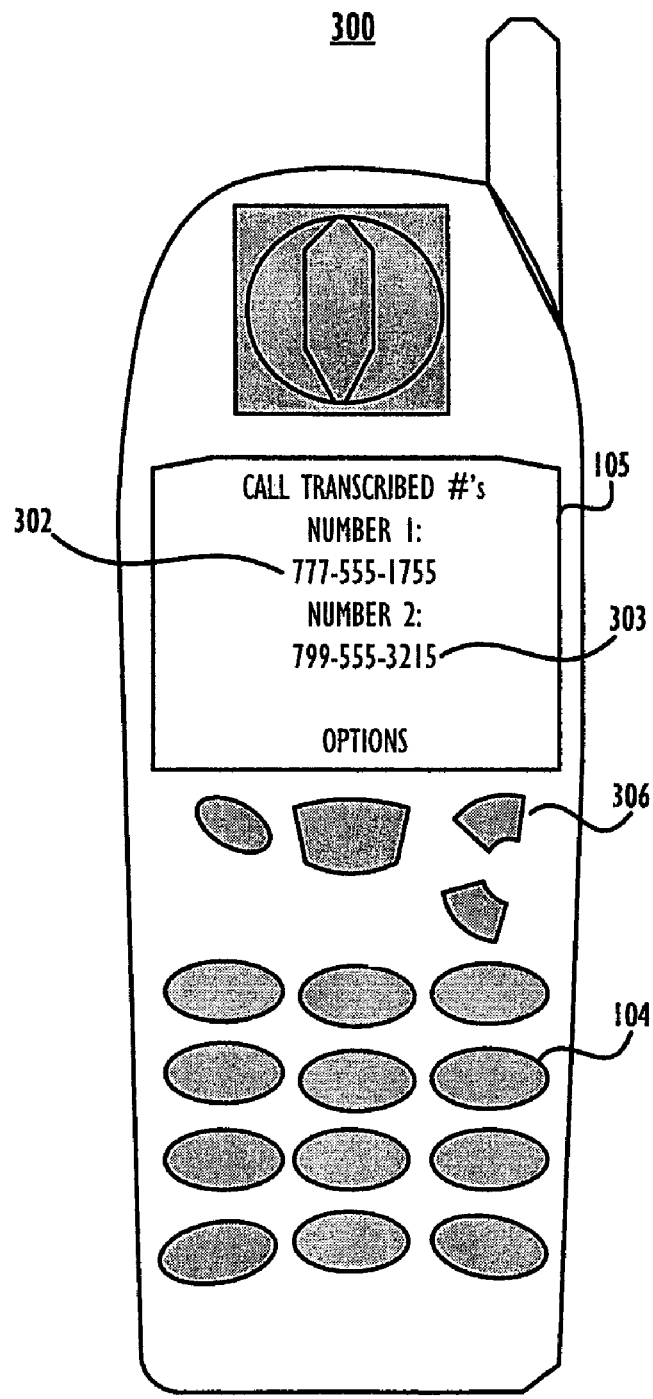
FIG. 3 is a digital telephone device illustrating the events log feature, according to one embodiment of the invention.

FIG. 3 is a digital telephone device illustrating the events log feature, according to an illustrative embodiment of the present invention. Device 100 comprises display 105, which shows, on a screen display, telephone numbers transcribed during a phone call. Thus, shown on display 105 is first number 302 and second number 303. Device 300 further comprises function keys 306 and keypad 104.

During a (previous) telephone call(s), speech recognition and transcription (SRT) utility 110 recognizes (as numbers) and extracts first number 302 and second number 303 from a conversation. These numbers are subsequently transcribed into text with SRT utility 110 embedded within device 300. SRT utility 110 then determines that these numbers are telephone numbers. Thus, SRT utility 110 records the telephone number in a pre-specified events log of the listener (of the spoken number(s)). Display 105 shows that these transcribed numbers are recorded into the listener's (pre-specified) log for numbers transcribed during a phone call. These numbers are recorded as "events" in the phone's logs (116), and the recipient has the option of taking action on these events. These phone numbers may then be dialed, saved as contacts, text messaged, etc., exactly like missed call events.

Figure 4:
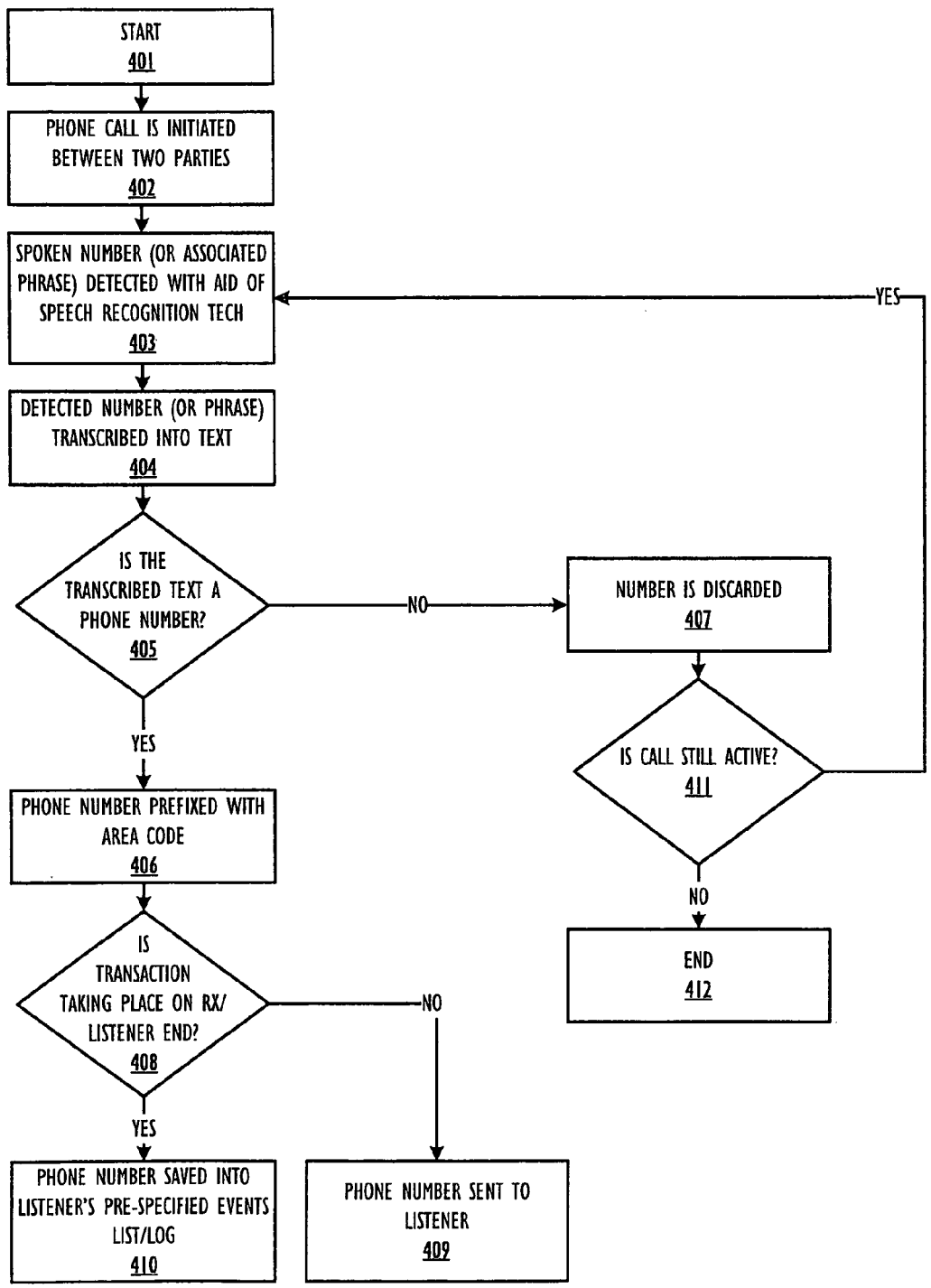
FIG. 4 is a flow chart illustrating the features and functionality of the speech recognition and transcription (SRT) utility, in accordance with one embodiment of the invention.

FIG. 4 is a flow chart illustrating the features and functionality of the speech recognition and transcription (SRT) utility by which the above processes of the illustrative embodiments are completed. Although the method illustrated in FIG. 4 may be described with reference to components shown in FIGS. 1-3, it should be understood that this is merely for convenience and alternative components and/or configurations thereof can be employed when implementing the various methods. Key portions of the method may be completed by SRT utility 110 executing within Device 100 (FIG. 1) and controlling specific operations of/on Device 100, and the method is thus described from the perspective of either/both SRT utility 110 and Device 100.

The process of FIG. 4 begins at initiator block 401 and proceeds to block 402, at which SRT utility 110 detects a phone call in progress between two parties. The ensuing conversation may take place between (at least) two live parties or may be a call to a voicemail, in which case the call occurs between a live party and the voicemail message system. Any number and/or any words and phrases closely associated (with telephone numbers) spoken during the phone call are detected by speech recognition and transcription (SRT) utility 110 within Device 100, as shown at block 403. At block 404, the detected number (or phrase) is transcribed into text by SRT utility 110. At decision block 405, SRT utility 110 determines whether the transcribed text (i.e., a sequence of numbers) is a telephone number. SRT utility 110 is able to recognize numbers of the appropriate digit length as potential phone numbers. SRT utility 110 is also able to key on certain phrases to spot potential phone numbers (i.e. "the number is", "call <person> at", etc.). If, at block 405, SRT utility 110 determines that the transcribed text is not a telephone number, the process moves to block 407, at which, SRT utility 110 discards the transcribed text.

In one embodiment, a partial telephone number is stored when one digit is not discernible as a result of an unclear utterance, for example. However, SRT utility 110 is still able to determine that the transcribed text is a telephone number, except that one digit is missing. SRT utility 110 may identify the location of the missing/unclear digit and replace the missing digit with an arbitrary non-numeric symbol. SRT utility 110 may, for example, use the letter "X" for the missing digit in the telephone number.

However, if at block 405 SRT utility 110 determines that the transcribed text is a telephone number, the process moves to block 406, at which, SRT utility 110 prefixes the telephone number with an assumed area code, if an area code is not provided by the transcribed text. The process moves to decision block 408, at which, SRT utility 110 determines whether the transcription of numbers (or associated text) is taking place on the end of the listener/receiver of the spoken words currently being transcribed. If SRT utility 110 determines that the transcription is taking place on the listener's end, the process moves to block 410, at which, SRT utility 110 saves the telephone number into the listener's pre-specified log (116) for numbers transcribed during a phone call. If SRT utility 110 determines that the transcription is not taking place on the listener's end but is taking place on the speaker's end, the process moves to block 409, at which, SRT utility 110 forwards (via a message) the telephone number to the listener. Optionally, SRT utility 110 may wait until the end of the call and each spoken number may be approved by the speaker (of each spoken number) before being sent to the receiver/listener. Processing on the speaker's end has the added advantage of succeeding even when the call (channel) is not completely clear and/or is breaking up on the listener/receiver's end. The process then moves to block 410, at which, the telephone number is recorded into the listener's pre-specified log for numbers transcribed during a phone call. These numbers are recorded as "events" in the phone's logs during/after the phone call, and the recipient has the option of taking action on these events. These phone numbers may then be dialed, saved as contacts, text messaged, etc., exactly like missed call events.

Following blocks 407 and 410, is decision block 411. At block 411, SRT utility 110 determines whether the phone call is still active. If SRT utility 110 determines that the call is still active, the process returns to block 403 to detect any further numbers and/or associated words. If SRT utility 110 determines that the call is no longer active, the process ends at block 412.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processor comprising a software application, a method comprising:

detecting speech indicative of a number spoken during one of a telephone call and a voicemail message;

transcribing the spoken number into text, wherein said transcribing further comprises:

in response to the transcribed number sequence being a telephone number, determining whether the transcription is taking place on a listener's end or on a speaker's end;

optionally prompting the speaker of the transcribed number for an approval prior to the transmission of the telephone number to the listener; and enabling the processing of the telephone number in the presence of an unclear communication channel as a result of a localized transcription; and when the transcription takes place on the speaker's end, forwarding a message, which includes the phone number information, to the listener for the number to be placed in the pre-specified events log of the listener's communication device;

determining whether a sequence of the transcribed spoken numbers is a telephone number; and recording the telephone number in a pre-specified events log of a memory of the communication device of the listener.

2. The method of claim 1 further comprising:
in response to a number not including the area code, prefixing the transcribed number with the current area code of the speaker of number; providing access to the transcribed number in the events list in order to execute one or more functions including:
(1) dialing the transcribed number;
(2) saving the transcribed number in a file of contacts; and
(3) transmitting a text message to the transcribed number.

3. The method of claim 1, wherein said determining further comprises:
recognizing the transcribed number as a telephone number with the use of knowledge of the expected length of a phone number; and
identifying the telephone number by a connection to frequently associated words and indicative phrases.

4. A communication device comprising:
a processor;
a memory system;
a network connection to one or more user communication systems;
a utility executing on the processor which provides the functions of:
detecting speech indicative of a number spoken during one of a telephone call and a voicemail message;
transcribing the spoken number into text, wherein said function for transcribing further comprises:
in response to the transcribed number sequence being a telephone number, determining whether the transcription is taking place on a listener's end or on a speaker's end;
optionally prompting the speaker of the transcribed number for an approval prior to the transmission of the telephone number to the listener; enabling the processing of the telephone number in the presence of an unclear communication channel as a result of a localized transcription; and
in response to the transcription taking place on the speaker's end, forwarding a message, which includes the phone number information, to the listener for the number to be placed in the pre-specified events log of the listener's communication device;
determining whether a sequence of the transcribed spoken numbers is a telephone number; and
recording the telephone number in a pre-specified events log of a memory of the communication device of the listener.

5. The device of claim 4 further comprising functions of:
in response to a number not including the area code, prefixing the transcribed number with the current area code of the speaker of number;
providing access to the transcribed number in the events list in order to execute one or more functions including:
(1) dialing the transcribed number;
(2) saving the transcribed number in a file of contacts; and
(3) transmitting a text message to the transcribed number.

6. The device of claim 4, wherein said functions for determining further comprises functions of:
recognizing the transcribed number as a telephone number with the use of knowledge of the expected length of a phone number; and identifying the telephone number by a connection to frequently associated words and indicative phrases.

7. A computer program product comprising:
a computer readable storage device; and
program code on said computer readable storage device that when executed within a data communication device generating and receiving voice data, said program code provides the functionality of:
detecting speech indicative of a number spoken during one of a telephone call and a voicemail message;
transcribing the spoken number into text, wherein said code for transcribing further comprises code for:
in response to the transcribed number sequence being a telephone number, determining whether the transcription is taking place on a listener's end or on a speaker's end;
optionally prompting the speaker of the transcribed number for an approval prior to the transmission of the telephone number to the listener;
enabling the processing of the telephone number in the presence of an unclear communication channel as a result of a localized transcription; and
in response to the transcription taking place on the speaker's end, forwarding a message, which includes the phone number information, to the listener for the number to be placed in the pre-specified events log of the listener's communication device;
determining whether a sequence of the transcribed spoken numbers is a telephone number; and
recording the telephone number in a pre-specified events log of a memory of the communication device of the listener.

8. The computer program product of claim 7 further comprising code for:
in response to a number not including the area code, prefixing the transcribed number with the current area code of the speaker of number; providing access to the transcribed number in the events list in order to execute one or more functions including:
(1) dialing the transcribed number;
(2) saving the transcribed number in a file of contacts; and
(3) transmitting a text message to the transcribed number.

9. The computer program product of claim 7, wherein said code for determining further comprises code for:
recognizing the transcribed number as a telephone number with the use of knowledge of the expected length of a phone number; and
identifying the telephone number by a connection to frequently associated words and indicative phrases.

* * * * *